United States Patent
Ukeda et al.

(10) Patent No.: US 8,417,929 B2
(45) Date of Patent: Apr. 9, 2013

(54) SYSTEM FOR SELECTING A SERVER FROM A PLURALITY OF SERVER GROUPS TO PROVIDE A SERVICE TO A USER TERMINAL BASED ON A BOOT MODE INDICATED IN A BOOT INFORMATION FROM THE USER TERMINAL

(75) Inventors: Masaharu Ukeda, Yokohama (JP); Souichi Takashige, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 317 days.

(21) Appl. No.: 12/718,264

(22) Filed: Mar. 5, 2010

(65) Prior Publication Data
US 2010/0325406 A1   Dec. 23, 2010

(30) Foreign Application Priority Data

Jun. 18, 2009   (JP) ................................. 2009-144884

(51) Int. Cl.
  *G06F 9/00* (2006.01)
  *G06F 15/177* (2006.01)
(52) U.S. Cl. .......................................................... 713/2
(58) Field of Classification Search .................. 713/2
  See application file for complete search history.

(56) References Cited

U.S. PATENT DOCUMENTS

| | | | | |
|---|---|---|---|---|
| 6,052,779 | A * | 4/2000 | Jackson et al. ..................... | 713/2 |
| 6,356,965 | B1 * | 3/2002 | Broyles et al. ................. | 710/104 |
| 6,598,159 | B1 * | 7/2003 | McAlister et al. ................. | 713/2 |
| 6,715,100 | B1 * | 3/2004 | Hwang ........................... | 714/5.1 |
| 6,748,525 | B1 * | 6/2004 | Hubacher et al. .................. | 713/1 |
| 7,139,816 | B2 * | 11/2006 | Anand et al. .................... | 709/220 |
| 7,574,592 | B2 * | 8/2009 | Dickens et al. .................... | 713/2 |
| 7,624,183 | B2 * | 11/2009 | Paul et al. ....................... | 709/226 |
| 7,664,834 | B2 * | 2/2010 | Keith, Jr. ....................... | 709/220 |
| 7,698,400 | B1 * | 4/2010 | Beloussov et al. ............ | 709/223 |
| 7,702,892 | B1 * | 4/2010 | Bandhole et al. ................. | 713/1 |
| 7,971,045 | B1 * | 6/2011 | Currid et al. ...................... | 713/1 |
| 2003/0009657 | A1 * | 1/2003 | French et al. ...................... | 713/2 |
| 2005/0138346 | A1 * | 6/2005 | Cauthron .......................... | 713/2 |
| 2008/0028052 | A1 * | 1/2008 | Currid et al. .................. | 709/222 |
| 2008/0043000 | A1 * | 2/2008 | Currid et al. .................. | 345/179 |
| 2010/0095105 | A1 * | 4/2010 | Sevak ............................. | 713/2 |

OTHER PUBLICATIONS http://download.intel.com/design/archives/wfm/downloads/pxespec.pdf; Version 2.1 Dated Sep. 20, 1999.*

* cited by examiner

*Primary Examiner* — Chun Cao
*Assistant Examiner* — Xuxing Chen
(74) *Attorney, Agent, or Firm* — Antonelli, Terry, Stout & Kraus, LLP.

(57) ABSTRACT

A cloud computing system is provided in order to meet the requirement for efficiently processing a large amount of information, and to meet the requirement for stable performance. This is achieved by a computer system including a user terminal, a plurality of servers connected to the user terminal through a network to provide services to the user terminal, and a management device for managing a server for providing a service to the user terminal. In the computer system, the user terminal transmits the boot information indicating one boot mode among fix boot, first boot, and not-first boot, to the management device. The management device selects a server for providing a service to the user terminal based on the boot information. Then, the selected server provides the service to the user terminal.

11 Claims, 9 Drawing Sheets

SYSTEM FOR SELECTING A SERVER FROM A PLURALITY OF SERVER GROUPS TO PROVIDE A SERVICE TO A USER TERMINAL BASED ON A BOOT MODE INDICATED IN A BOOT INFORMATION FROM THE USER TERMINAL

CLAIM OF PRIORITY

The present invention claims priority from Japanese patent application JP2009-144884 filed on Jun. 18, 2009, the content of which is hereby incorporated by reference into this application.

BACKGROUND OF THE INVENTION

The present invention relates to a computer system and a management device.

A cloud computing service is a service for providing IT resources to a plurality of customers based on the demands of the customers. An example of this is described in http://www.gartner.co.jp/b3i/reserch/081210_inf/index.html, "Method of Distinguish Cloud Computing", searched on Jun. 5, 2009.

SUMMARY OF THE INVENTION

A cloud computing service uses virtualization technology to divide an integrated IT resource to provide one or a plurality of virtual servers to users.

The virtual server is provided by logically cutting out from the integrated IT resource. Thus, the procurement of such virtual servers is easier than that of convention physical servers. This attracts attention in the field in which a large amount of resources should be added, such as booming Web services, as well as simulation and transcoding in which a large amount of information is desired to be processed at the same time.

However, although a reduction in cost can be expected on the operator side by virtualizing and consolidating servers on an integrated IT resource, the network throughput decreases as the consolidation increases in which the virtual servers share the network.

Further, the size of the cloud computing service is increased with thousands and tens of thousands terminals in accordance with the number of users. At this time, the physical distance of the network, as well as the number of routers and switches in the network increase as the size of the system is increased. Thus, there is a problem that the network performance is likely to be a bottleneck as the size of the system is increased. This may lead to a result that the system, which was running without a problem during the initial phase after the conclusion of the contract, is influenced by the system expansion and high consolidation on the operator side, and is unlikely to operate as it was intended. This problem may not be negligible in the use of the cloud computing service for mission critical applications such as bank accounting services.

Thus, in order to establish a cloud computing service, it is desirable to have a system that meets the requirement for efficiently processing a large amount of information, and to meet the requirement for stable performance.

To solve the above problem, the present invention has the following configuration. That is, there is provided a computer system including a user terminal, a plurality of servers connected to the user terminal through a network to provide services to the user terminal, and a management device for managing a server for providing a service to the user. The user terminal transmits the boot information indicating one boot mode among fix boot, first boot, and not-first boot, to the management device. The management device selects a server for providing a service to the user terminal based on the boot information. Then, the selected server provides the service to the user terminal.

Further, there is provided a management device for selecting a server for providing a service to a user terminal, from a plurality of servers connected to the user terminal through a network to provide services to the user terminal. The management device includes a communication unit for communicating with the user terminal through a network, and an operation unit for selecting a server for providing a service to the user terminal based on the information received by the communication unit. The communication unit receives the boot information transmitted from the user terminal to indicate one boot mode among fix boot, first boot, and not-first boot. The operation unit selects a server for providing a service to the user terminal based on the boot information.

According to the present invention, it is possible to provide a technology for processing a large amount of information more efficiently, and for obtaining stable performance.

These and other features, objects and advantages of the present invention will become more apparent from the following description when taken in conjunction with the accompanying drawings.

BRIEF DESCRIPTION OF THE DRAWINGS

Embodiments of the present invention will be described in detail based on the following figures, wherein.

DESCRIPTION OF THE EMBODIMENTS

The users of the cloud computing service can be roughly classified into two types. One is those who expect stable performance and quality in order to perform mission critical operations. The other is those who want to use a large amount of resources on a best effort basis. In the embodiments of the present invention, a user explicitly provides a specification according to the type of the user, to allow the cloud computing service side to allocate an IT resource appropriate for the request of the user.

At this time, the allocation control of the IT resources is performed based on assumption that IT resources provided at the same positions of physical and logical topologies as the positions previously used, are likely to have the same performance as they had previously. In other words, IT resources are reserved in advance for topologies according to the number of users of the former type, and IT resources for remaining topologies are allocated to the latter type. In addition, the traffic flowing into the network is also controlled. In other words, the former type is prioritized and the route is fixed, while the latter type is not prioritized and the optimal route is selected. This reduces the influence on the former type due to the increase in the number of users of the latter type. As a result, it is possible to provide a service using a single integrated IT resource to the users of different types.

Figure 1:
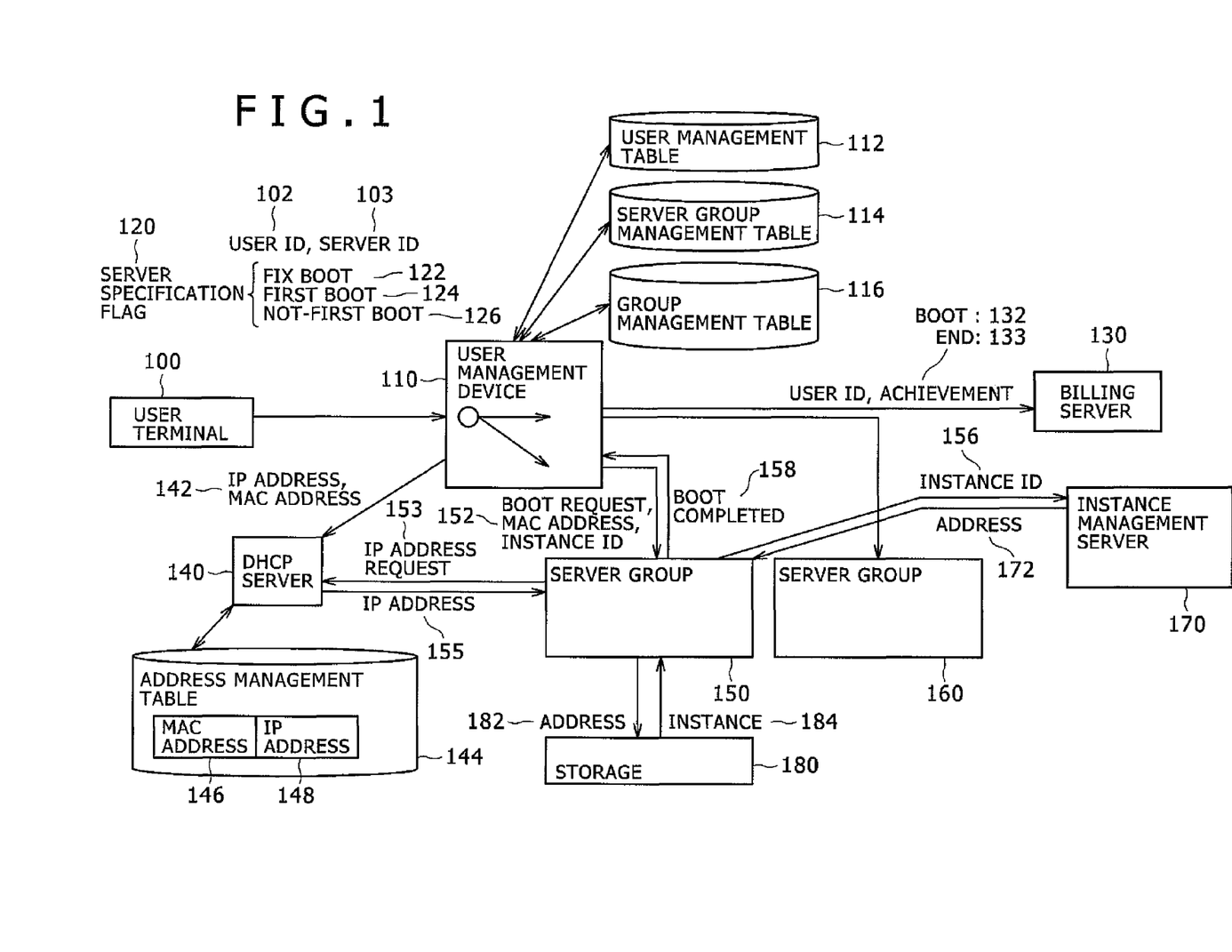
FIG. 1 is a block diagram showing an example of a cloud computing system according to an embodiment of the present invention.

FIG. 1 shows a first embodiment of the present invention, which shows a configuration of a cloud computing system. The first embodiment is a model that a company has a plurality of servers inside, in which the information system department manages the servers as a whole. In response to a request from a user, the information system department creates virtual servers on a physical server managed by the information system department, and lends to the user in a unit of virtual server. At this time, the information system department allocates a plurality of virtual servers to a single physical server. This allows to consolidate the number of servers, compressing the server installation cost and server management cost. At this time, the allocation of which virtual server to which physical server is dynamically determined according to the load on the physical server at each time, or the allocation is fixed from the start. In the method for allocating the virtual server according to the load on the server, the allocation of a new virtual server influences both on the performance of the virtual server currently allocated to the physical server, and on the occupancy of the network. For this reason, this method may not be suitable for the operation such as batch operation that is expected to provide stable operation based on the performance prediction. Further, in the operation in which the allocation is fixed from the start, there is a problem that it is difficult to have a cost reduction effect of the server consolidation. The present embodiment solves the above problem.

In FIG. 1, a user terminal 100 is connected to a user management device 110 through a network. The user management device 110 can access a user management table 112, a server group management table 114, and a group management table 116. Each of the user management table 112, the server group management table 114, and the group management table 116 is stored in a database, for example, in a storage device such as an HDD. However, each of the tables may be stored within the user management device 110, or may be managed outside the user management device 110, such as by a server. The user management device 110 is connected to a DHCP server 140, a server group 150, a server group 160, a billing server 130, and an instance management server 170, respectively, through a network. Here, the user management device 110, the DHCP server 140, servers included in the server group 150, servers included in the server group 160, the billing server 130, and the instance management server 170 may be Unix (registered trademark) servers, windows (registered trademark) servers, or mainframe servers, that are controlled by OS such as UNIX (registered trademark), Windows (registered trademark), or dedicated OS.

Figure 9:
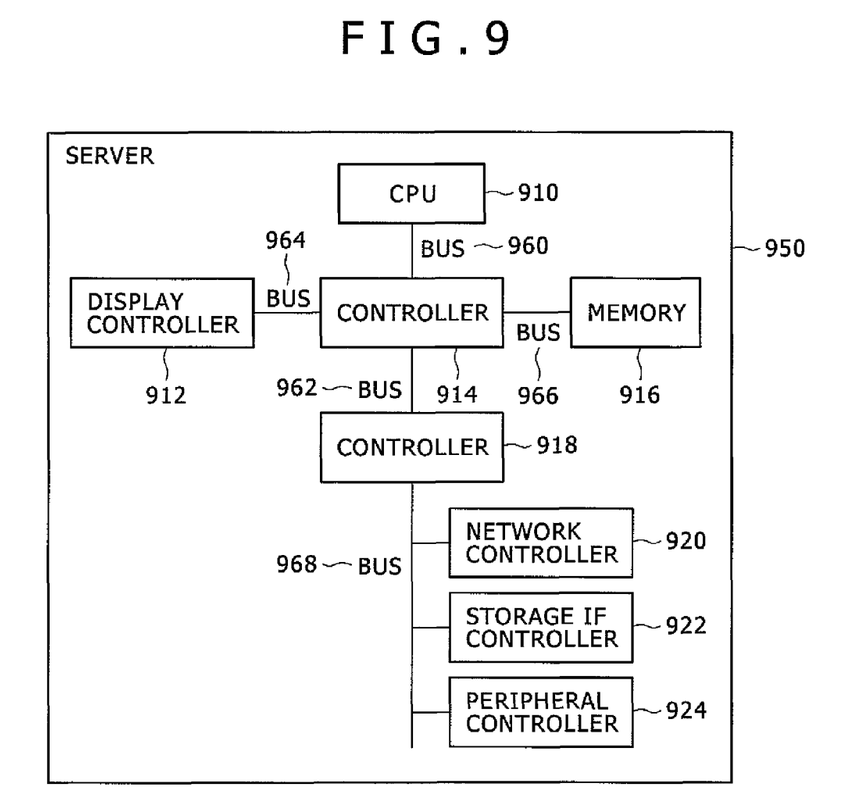
FIG. 9 is a block diagram showing a basic configuration of a server.

FIG. 9 shows the basic configuration of a server constituting the user management device 110, the DHCP server 140, the server included in the server group 150, the server included in the server group 160, the billing server 130, and the instance management server 170. The hardware configurations of the servers are substantially the same. In the following description, a server having the basic configuration will be referred to as a server 950.

The server 950 includes a CPU 910, a controller 914, a controller 918, a memory 916, a display controller 912, a network controller 920, a storage IF controller 922, and a peripheral controller 924. The CPU 910 is connected to the controller 914 by a bus 960. The controller 914 is connected to the display controller 912 by a bus 964. The controller 914 is connected to the memory 916 by a bus 966. The controller 914 is connected to the controller 918 by a bus 962. The controller 918 is connected to the network controller 920, the storage IF controller 922, and the peripheral controller 924 by a bus 968, respectively.

The CPU 910 is an operation unit for processing a program and data developed on the memory 916. The memory 916 is a main storage device that is typically a volatile memory for temporarily storing a program and data. However, the memory may have the characteristics as a nonvolatile memory. Each of the flowcharts described below with reference to the drawings, is realized by the CPU executing a program in each server, as long as there is no specific description.

Further, the display controller 912 is a processing device for temporarily holding frame data for display processed by the CPU, and for transferring the data to a display synchronously or asynchronously. However, the display controller 912 may hold display frame data for one or more frames in the memory 916. Further, the display controller 912 may perform a part of the display operation in place of the CPU 910. The controller 914 is a processing device for controlling communication of the CPU 910, the display controller 912, the memory 916, and the controller 918. The controller 918 is a processing device for controlling communication of the controller 914, the network controller 920, the storage IF controller 922, and the peripheral controller 924. However, the functional allocation of the controller 914 and the controller 918 is not limited to the combinations described above. Further, the controllers 914 and 918 are described herein as two separate controllers, but may be function as a single controller.

The network controller 920 is a controller for accessing LAN, Internet, or a dedicated network, by means of a wired or wireless connection. The storage IF controller 922 is an IF controller such as SATA IF or SAS IF for connecting to a disk drive, or is an IF controller such as Fiber Channel IF for connecting a SAN connected disk array. The peripheral controller 924 is an IF controller for controlling USB IF, Bluetooth IF (registered trademark), or UART IF, and the like.

Here, the memory 916 or the display controller 912 may be connected to the CPU 910 in such a way that the CPU 910 has the function of the controller 914, or may be included in the CPU 910. Similarly, the display controller 912 may be connected to the CPU 910, or may be included in the CPU 910. The server 950 may be treated as if it were a plurality of servers, in such a way that hardware resources are virtualized by using the logical partitions or hypervisors. Here, the server selection method, which is performed based on a server ID 214 as described below, may be associated with physical servers when the unit of selection is the physical server, and may be associated with virtual servers when the unit of selection is the virtual server.

The server 950 having such a configuration is controlled by an OS such as Windows OS (registered trademark), Unix OS (registered trademark), or dedicated OS. The type of the server 950 may be identified as the user management device 110, the DHCP server 140, the billing server 130, or the instance management server 170, according to the operation of the application installed on the OS. Further, the servers belonging to the server groups 150 and 160 are servers without a specific function such as OS installation. These servers may be able to function as the user management device 110, the DHCP server 140, the billing server 130, or the instance management server 170, by the installation of each OS and application.

Further, in FIG. 1, the DHCP server 140 can access an address management table 144. The address management table 144 is a table used to map a MAC address 146 of a virtual server to an IP address 148. Here, the address management table 144 may be stored in the user management device 110, or may be managed by a server, and the like, outside the user management device 110. Further, the server group 150 is connected to a storage 180. The storage 180 may be a local disk connected by SATA or IDE of the server group 150, or may be connected by a network such as SAN.

The system configuration described herein is designed in accordance with the configuration of a typical cloud computing system, except for the characteristics of the user management device 110 described below. Thus, it should be understood that the present embodiment is not limited by the above described configuration.

The present embodiment is characterized by a method for selecting a server group by the user management device 110 at the time when the user terminal 100 boots a server. Upon booting the server, the user terminal 100 transmits a server specification flag 120 which is the information for specifying the boot location of the server, in addition to a user ID 102 and a server ID 103. The user ID 102 is the information for uniquely identifying the user. The server ID 103 is the information for identifying the server to be booted. The server specification flag 120 may include boot information to indicate a boot mode that identifies the following: a fix boot 122 that requires to boot the server only at a specific location, a first boot 124 that requires to boot the server at a specific location on a prioritized basis, and a not-first boot 126 that has no requirement for the boot location of the server.

Figure 2:
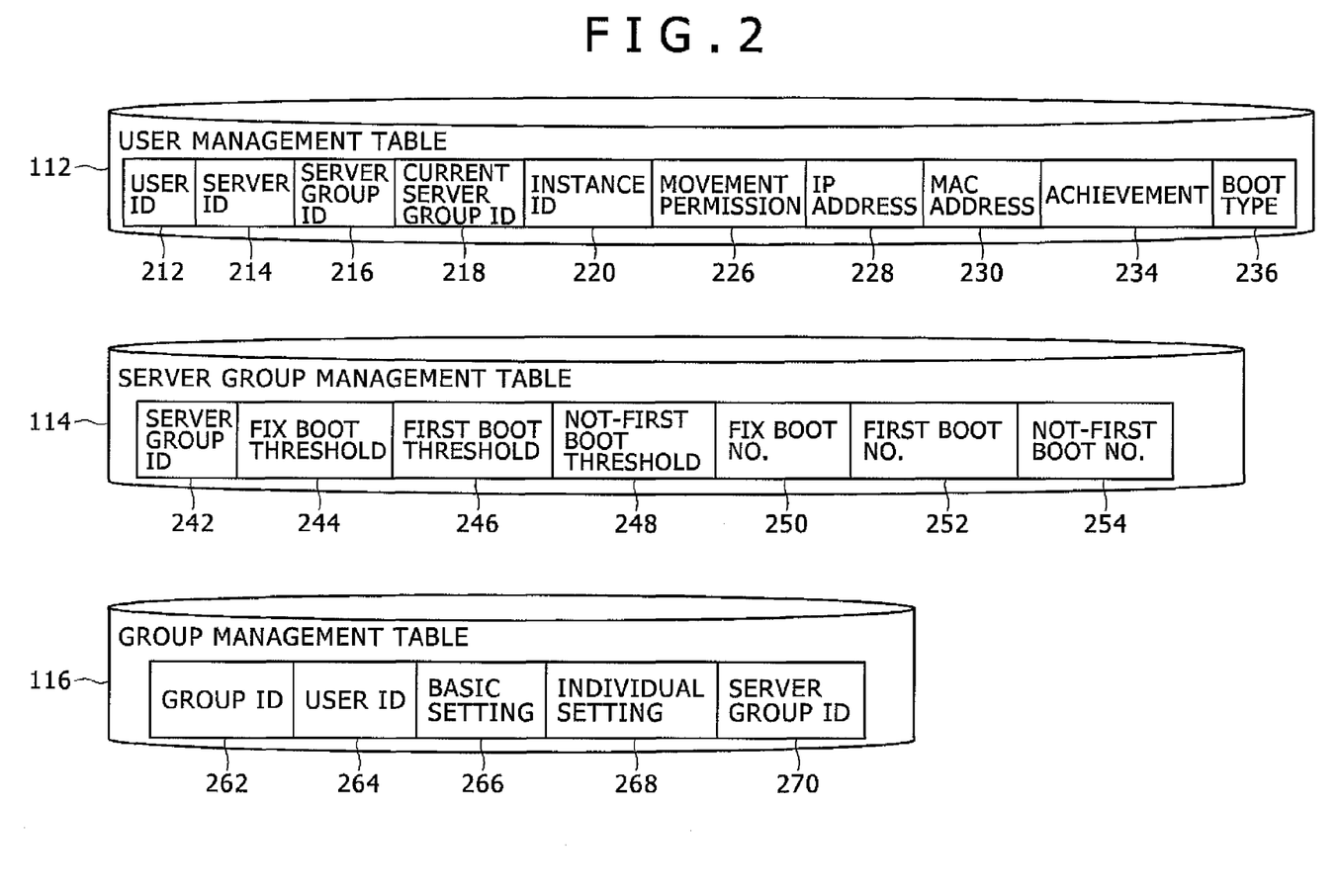
FIG. 2 is a detailed view of a user management table, a server group management table, and a group management table.

FIG. 2 shows in detail the user management table 112, the server group management table 114, and the group management table 116. Each of the user management table 112, the server group management table 114, and the group management table 116 may be a table on a database generated on a storage.

The user management table 112 may include, as table elements, a user ID 212, a server ID 214, a server group ID 216, a current server group ID 218, an instance ID 220, a movement permission 226, an IP address 228, a MAC address 230, an achievement 234, and a boot type 236. The user ID 212 is the information for identifying the user, such as a user name, serial number, fixed global address of a user terminal, or DNS entry name. The server ID 214 is a unique ID assigned to each virtual server or each physical server. The server group ID 216 is an ID assigned to a group of servers. In the case of managing a large amount of servers, it is preferable to manage them, for example, based on a unit of servers connected to an L2 or L3 switch or on a unit of rack in which servers are stored, instead of managing the servers one by one. This is because when the size of the system is increased, the number of switches for internal communication, as well as the network bandwidth along the paths are a bottleneck. As a result, the access performance is not uniform in a close network and in a distant network. Further, in the case of the servers in the same rack, the servers may share a power supply, and may not effectively recover from a failure even with the disaster recovery configuration. Thus, also from this point of view, managing servers in a unit of a block is likely to be effective. The current server group ID 218 stores the server group ID 216 that the user ID 212 last used. The instance ID 220 describes the ID of a set of OS and application to be booted on the selected server. The movement permission 226 indicates whether the server allocated by the server ID 214 can be changed to a server indicated by the other server ID. The IP address 228 indicates a set of IP addresses allocated to the server ID 214. The IP address 228 may store one or more IP addresses that are locally and globally allocated. The MAC address 230 may store a MAC address of physical NIC or virtual NIC that is installed in the server indicated by the server ID 214. The achievement 234 may store the information for identifying how the server is booted as a result of the specification based on the server specification flag 120. The boot type 236 may store the information indicating whether the server is booted for the first time.

The server group management table 114 may include, as table elements, a server group ID 242, a fix boot threshold 244, a first boot threshold 246, a not-first boot threshold 248, a fix boot number 250, a first boot number 252, and a not-first boot number 254. The server group ID 242 is the information indicating that the values of the table are associated with which server group. The fix boot threshold 244 indicates the number of servers that can be booted in the server group but is not allowed to be booted in another server group. The first boot threshold 246 indicates the number of servers that has the movement permission and is allowed to be booted in the specified server group. The not-first boot threshold 248 indicates the number of servers that can be booted independent of the server specification and the state of movement permission. The fix boot number 250 indicates the number of servers currently booted but not allowed to be moved. The first boot number 252 indicates the number of servers currently booted and allowed to be moved, in the server group of the server ID specified according to the selection from the user. The not-first boot number 254 indicates the number of servers to which the boot location is specified according the availability in the server group, and is not by a user specification.

The group management table 116 may include, as table elements, a group ID 262, a user ID 264, a basic setting 266, an individual setting 268, and a server group ID 270. The group management table 116 may be able to be used for managing a plurality of users as a whole, such as in the case of a company. In this case, the group ID 262 may store an ID for identifying a group such as a company. The user ID 264 may store a user ID belonging to a group ID. The basic setting 266 may store common setting information set for the user of the group ID 262, or an ID indicating common setting information. The individual setting 268 may store a setting of each user. The server group ID 270 is an identifier that indicates the server group to be typically allocated at the time when the user boots a server.

Figure 3:
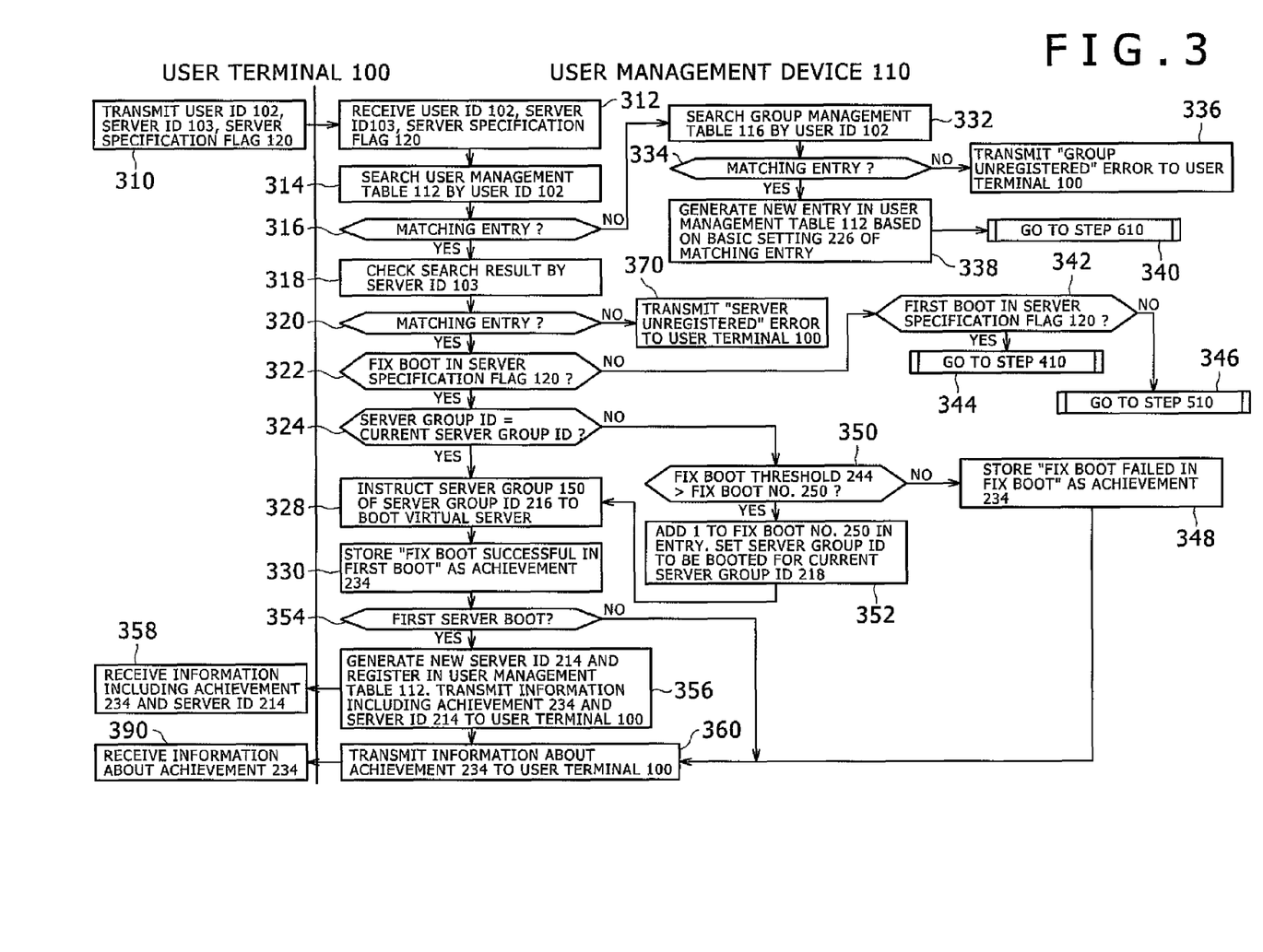
FIG. 3 is a flowchart showing the procedure for booting a server using a server specification flag.

FIG. 3 is a flowchart showing the operation of the user management device 110 at the time when a server is booted. The user management device 110 receives the user ID 102, the server ID 103, and the server specification flag 120 from the user terminal 100 (310, 312). Then, the user management device 110 searches for the entry with the same ID 212 from the user management table 112 based on the user ID 102 as a key (314). At this time, the user management device 110 searches for all the entries with the same user ID 102 in the user management table 112. Next, the user management device 110 checks whether the search result has at least one entry (316). At this time, the user management device 110 checks for all the entries with the same user ID stored in the user management table 112. When there is no entry with the same user ID 102 as the user ID 102, the user management device 110 determines that this is the first use of the server, and searches the group management table 116 based on the user ID 102 (332). Next, the user management device 110 checks whether the search result has an entry including the user ID 102 (334). When the corresponding user ID 102 is not found, the user management device 110 determines that the user with the user ID 102 is not registered, and transmits an error indicating "group not registered" to the user terminal 100 (336). Upon receiving the error, the user terminal 100 may perform a process for adding the user to the group, in addition to this step. In the case of adding the user, the process may return to step 310 and start to boot the server again. When an entry is found in step 334, the user management device 110 registers a new entry in the user management table 112 based on the basic setting 226 stored in the matching entry (338). At this time, the user ID 212 and the server group ID 216 may be included in the information to be registered in the entry. After the completion of the registration, the user management device 110 performs step 610 which will be described in detail below.

When an entry is found in step 316, the user management device 110 next searches the content of the found entry based on the server ID 214 (318). Then, the user management device 110 checks whether the entry matches in the search result (320). If an entry matching the server ID 214 is not found, the user management device 110 transmits an error indicating "server not registered". At this time, the user terminal 100 performs the steps of the server registration flowchart shown in FIG. 7. The server registration flowchart will be described in detail below.

When a matching entry is found in step 320, the user management device 110 checks whether the server specification flag 120 is a fix boot (322). If the server specification flag 120 is not the fix boot, the user management device 110 next checks whether the server specification flag 120 is a first boot (342). When the server specification flag 120 is the first boot, the user management device 110 performs step 410 (344). Otherwise, the user management device 110 determines that the server specification flag 120 is a not-first boot and performs step 510 (346). When there is no specification set in the server specification flag 120, the user management device 110 may be able to determine that it is the not-first boot. Steps 410 and 510 will be described in detail below.

When the server specification flag 120 is the fix boot in step 322, the user management device 110 determines whether the server group ID 216 is equal to the current server group ID 218 in the entry identified in step 318, in the user management table 112. Here, the server group ID 216 is the ID of the server group allocated to the user or the group. While the current server group ID 218 is the ID of the currently allocated server group. In the first boot and the not-first boot, the current server ID 218 is deleted when the server use is ended. In this case, when the previous boot was based on the fix boot, the current server ID 218 is left without being deleted. In other words, the server resource is kept reserved. However, even if the fix boot has been selected and successful, when it is once moved to the first boot, the next first boot is not guaranteed to be successful. When the server group ID 216 and the current server group ID 218 do not match in step 324, the user management device 110 checks whether the fix boot threshold 244 is greater than the fix boot number 250 in the server group management table 114 (350). The fix boot threshold 244 indicates the number of virtual servers that can be reserved in the server group. The fix boot number 250 is the number of virtual servers already reserved. Both the fix boot threshold 244 and the fix boot number 250 are the information indicating the occupancy of the server group. When the fix boot threshold 244 matches the number of virtual servers that can be allocated to the server group, all the servers belonging to the server group are mapped to the user. In this case, even if the user does not use a resource, the resource will not be allocated to the other user. Note that the mapping of virtual servers and physical servers may be performed, but not in all cases.

When the fix boot threshold 244 is greater than the fix boot number 250 in step 350, the user management device 110 adds 1 to the fix boot number 250 in the entry. Further, the user management device 110 sets the server group ID 216 to be booted for the current server group ID 218 (352), and goes to step 328. If not so, the user management device 110 may store "fix boot failed in the fix boot" as the achievement 234 (348), and may perform step 360.

Here, it is possible that there are one or more server group IDs 216 that can be allocated to a single user ID. When the server reservation is failed in step 350, the user management device 110 may boot the other server in the range of the server group allowed by the group to which the user belongs. However, with this control the performance may not be the same as in the previous boot. In order to explicitly indicate that the control is performed, a sub fix boot 128 may be set to the server specification flag 120. Also, in order to explicitly indicate that the control has been performed, the user management device 110 may register "sub fix boot successful in the sub fix boot" in the achievement 234 when the control was successful. At this time, the user management device 110 may change both the server group ID 216 and the current server group ID 218, to the booted server ID 216 and the current server ID 218.

When the server group ID 216 and the current server group ID 218 match in step 324, the user management device 110 instructs the server group 150 indicated by the server group ID 216 to boot a virtual server (328).

An example of the server boot procedure in FIG. 1 is as follows. The user management device 110 registers the IP address and the MAC address to the DHCP server 140 (142). The DHCP server 140 registers the received MAC address 146 and IP address 148 to the address management table 144. Next, the user management device 110 transmits a boot request including the MAC address and the instance ID to the server group 150 (152). The server group 150 boots the virtual server, while registering the transmitted MAC address to the NIC. Next, the server group 150 transmits the transmitted instance ID 220 to the instance management server 170 (156). Then, the instance management server 170 returns the address or directory of the storage in which the instance indicated by the ID is stored (172). Here, the instance is the image of the OS in which the application to be booted on the virtual server is installed. The image of the OS may be formed from the OS image running on the physical server, based on the specification of the virtual layer to be used. Note that with respect to the step of inquiring the instance management server 170 about the address from the instance ID 220, the user management device 110 may perform the step and may transmit the address in place of the instance ID 220 in step 152.

The server group 150 reads the instance from the storage 180 based on the address received in step 172 (182, 184), and runs it on the virtual server. The booted virtual server inquires the DHCP server 140 about the IP address (153), and receives and sets the allocated IP address (155). At last, the server group 150 transmits a boot completion notification to the user management device 110 (156). However, the server boot procedure described herein is not dependent on the function of the server specification flag 120, and thus it goes without saying that this part is independent of the procedure described above.

When the server is booted as described above, the user management device 110 registers the information indicating "fix boot successful in the fix boot" to the achievement 234 of the user management table 120 (330). After the registration, the user management device 110 determines whether this is the first server boot based on the boot state 236 (354). When there is no description in the boot state 236, the server is normally booted. When this is not the first server boot, the user management device 110 transmits the information about the achievement 234 to the user terminal 100, and then the user terminal 100 receives the information (360, 390). On the other hand, when this is the first server boot, the user management device 110 newly generates the server ID 214, and registers the generated server ID 214 in the user management table 112. Then, the user management device 110 transmits the information including the achievement 234 and the server ID 214 to the user terminal 100. The user terminal 100 receives the information including the achievement 234 and the server ID 214. As described above in the case of the first server boot, the server ID is provided after the server is booted, and the next and subsequent connections are performed using the provided server ID (356, 358).

Figure 4:
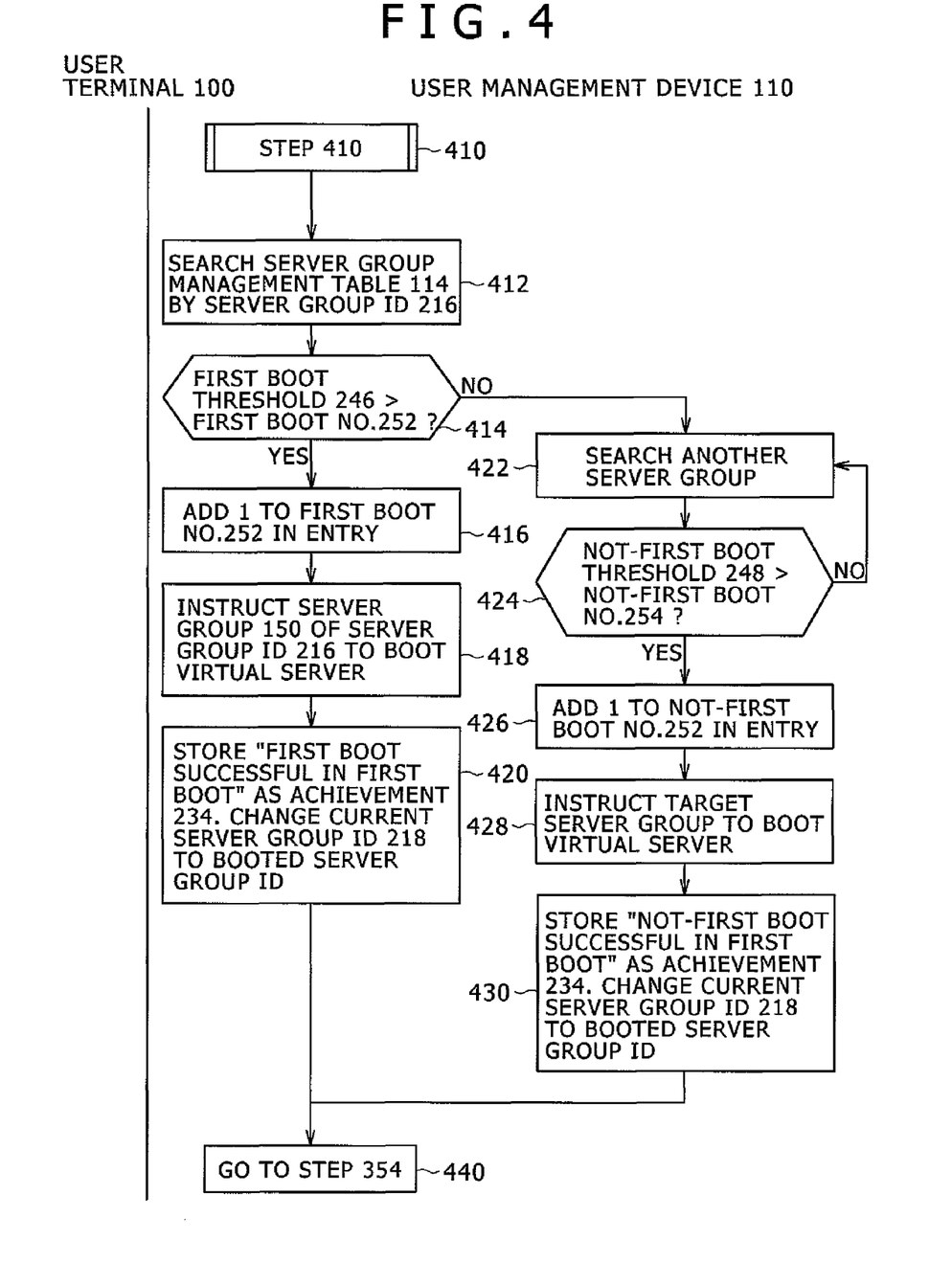
FIG. 4 is a flowchart showing the procedure for booting a server based on a first boot.

FIG. 4 is a flowchart showing the procedure to which the first boot is applied. When the server specification flag 120 is the first boot 124, the user management device 110 searches for the corresponding entry from the server group management table 114 based on the server group ID 216 (412). When a corresponding entry is found, the user management device 110 determines whether the first boot threshold 246 in the entry is greater than the first boot number 252 (414). When this condition is not satisfied, the user management device 110 searches another server group included in the server group management table 114 (422). Then, similarly the user management device 110 determines whether the not-first boot threshold 248 in the entry is greater than the not-first boot number 254 (424). When this condition is not satisfied, the process returns to step 422. In this case, the first boot threshold 246 and the first boot number 252 are not used, because the first boot is the mode that should first allocate to the group using the same server group. However, in a system with less relationship between the server group and the group, the determination may be performed using the first boot threshold 246 and the first boot number 252, or using the not-first boot threshold 248 and the not-first boot number 254. When the condition is satisfied in step 424, the user management device 110 adds 1 to the not-first boot number 252 (426), and instructs the target server group to boot a virtual server (428). After the server is booted, the user management device 110 stores "not-first boot successful in the first boot" as the achievement 234, and changes the current server group ID 218 to the booted server group ID (430). Then, the user management device 110 performs step 354 and subsequent steps (440).

When the condition is satisfied in step 414, the user management device 110 adds 1 to the first boot number 252 in the entry (416), and instructs the server group 150 of the server group ID 216 to boot a virtual server (418). After the server is booted, the user management device 110 stores "first boot successful in the first boot" as the achievement 234, and changes the current server group ID 218 to the booted server group ID (420). Then, the user management device 110 performs step 354 the subsequent steps (440).

Figure 5:
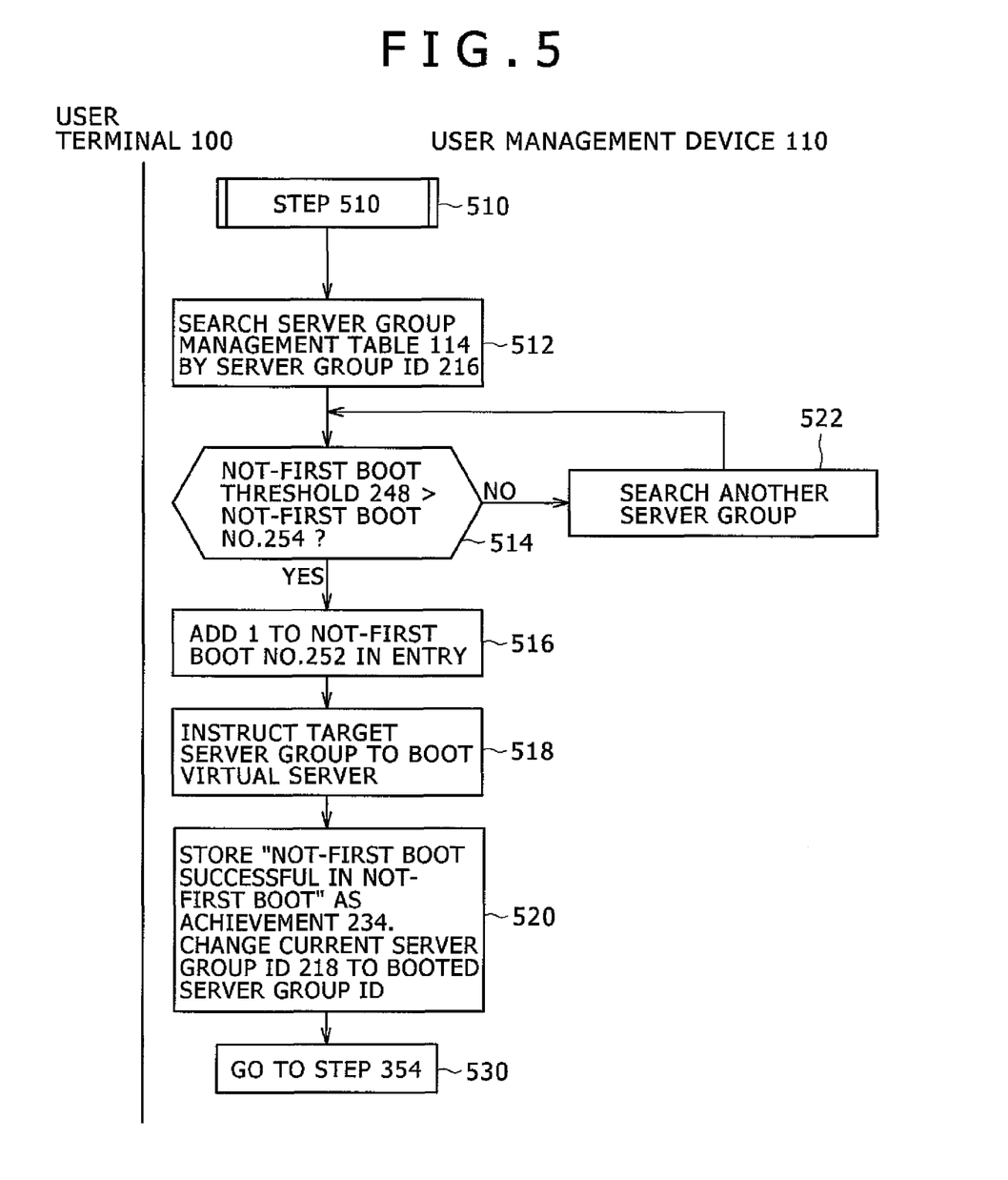
FIG. 5 is a flowchart showing the procedure for booting a server based on a not-first boot.

FIG. 5 is a flowchart showing the procedure to which the not-first boot is applied. When the server specification flag 120 is the not-first boot 126, the user management device 110 searches the server group management table 114 based on the server group ID 216 (512). Next, the user management device 110 checks the entry in the search result to determine whether the not-first boot threshold 248 is greater than the not-first boot number 254 (514). When this condition is no satisfied, the user management device 110 searches another server group (522), and performs step 514 with respect to the other searched server group. At this time, the other server group to be searched is preferably selected under the condition that the server group to be searched and the first searched server group are close in network distance.

When the condition is satisfied in step 514, the user management device 110 adds 1 to the not-first boot number 254 in the entry (516). Then, the user management device 110 instructs the target server group to boot a virtual server (518). After the server is booted, the user management device 110 registers "not-first boot successful in the not-first boot" as the achievement 234, and registers the booted server group ID as the current server group ID 218 (520). Then, the user management device 110 performs step 354 and subsequent steps (530).

Figure 6:
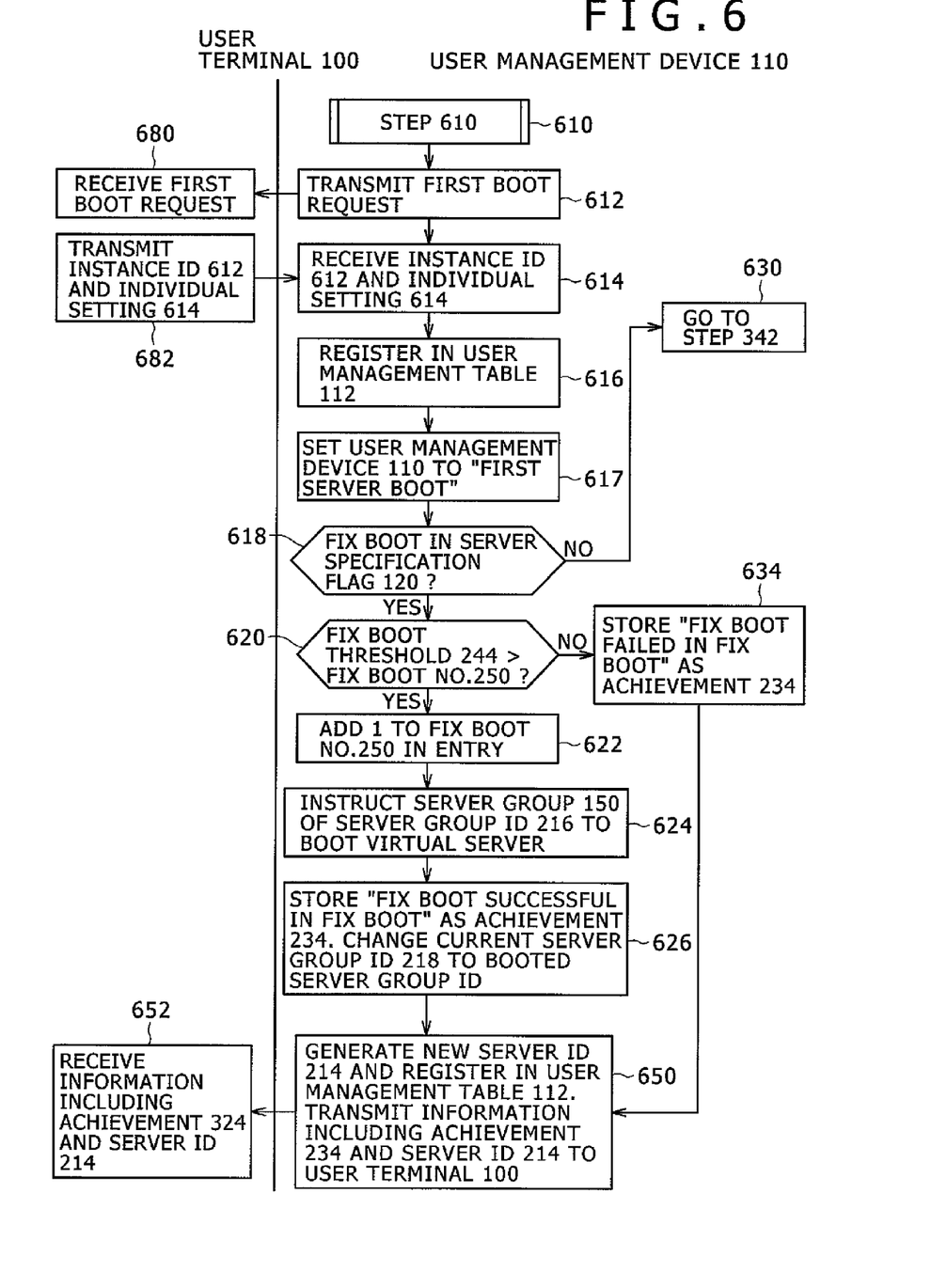
FIG. 6 is a flowchart showing the procedure for booting a server at the time when the user is registered.

FIG. 6 is a flowchart showing the procedure when the user uses for the first time. The user management device 110 registers an entry of the user as the base in step 338. Then, the user management device 110 notifies the user terminal 100 that this is the first server boot (612). The user terminal 100 receives the request from the user management device 110 (680), and transmits the information including the instance ID 612 and the individual setting 614, to the user management device 110 (682). Here, the individual setting 614 may include the information about security setting such as firewall, whether or not to operate as a fixed IP address, the capacity and performance of the server to be booted, and the like. The user management device 110 receives the information including the information 612 and 614 (614), and registers the information to the user management table 112 (616). Here, once the entry of the user is registered, the user terminal 100 transmits the ID and individual setting of the instance to be booted. However, it is also possible to provide a one-path server function by transmitting the data including the instance ID 612 and the individual setting 614, in addition to the data transmitted in step 310 from which the server ID 214 is omitted. In both cases, there is no difference in the use of the server specification flag 120, and thus it goes without saying that the difference in the protocol is not a problem.

After step 616, the user management device 110 stores the information indicating that the server is first booted into the boot type 236 (617). Then, the user management device 110 determines whether the server specification flag 120 is the fix boot (618). When this condition is not satisfied, the user management device 110 performs step 342 and subsequent steps. When this condition is satisfied, the user management device 110 determines whether the fix boot threshold 244 is greater than the fix boot number 250 (620). When the condition is not satisfied, the user management device 110 stores "fix boot failed in the fix boot" as the achievement 234 (634). Then, the user management device 110 newly generates the server ID 214, and stores the generated server ID 214 to the user management table 112. Then, the user management device 110 transmits the information including the achievement 234 and the server ID 214 to the user terminal 100 (650). The user terminal 100 receives the information including the achievement 234 and the server ID 214 (652).

When the condition is satisfied in step 620, the user management device 110 adds 1 to the fix boot number 250 in the entry (622). Then, the user management device 110 instructs the server group 150 of the server group ID 216 to boot a virtual server (624). After the server is booted, the user management device 110 registers "fix boot successful in the fix boot" as the achievement 234, and changes the current server group ID 218 to the ID of the booted server group (626). Then, the user management device 110 performs step 650 and subsequent steps.

Figure 7:
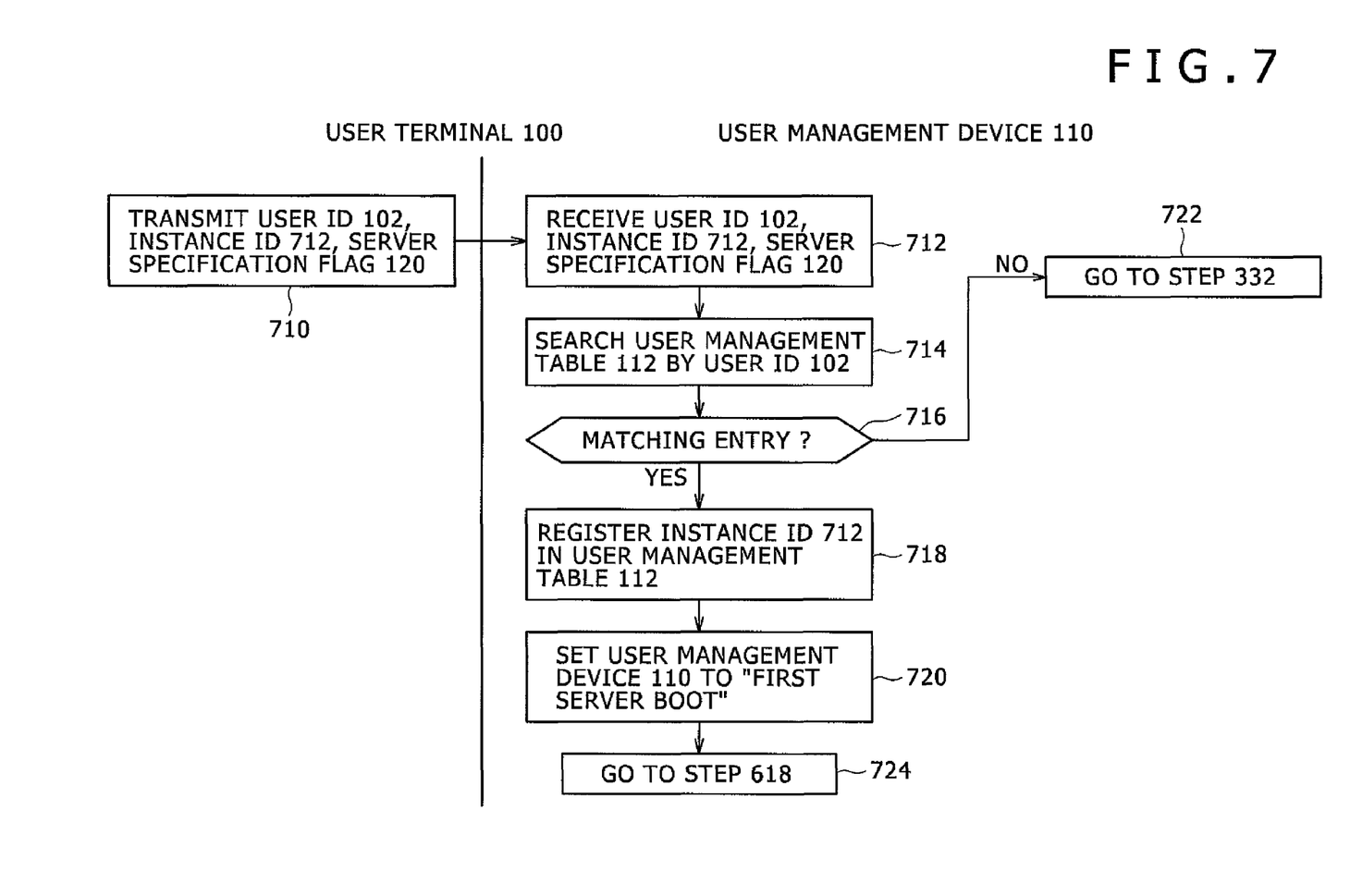
FIG. 7 is a flowchart showing the procedure for booting a server at the time when the server is booted for the first time.

FIG. 7 is a flowchart showing the procedure when the user entry has been registered but the first server boot is not performed. The user terminal 100 transmits the user ID 102, the instance ID 712, and the server specification flag 120 to the user management device 110 (710). The user management device 110 receives the information from the user terminal 100 (712), and searches the user management table 112 based on the user ID 102 (714). Then, the user management device 110 checks whether the search result has a corresponding entry (716). When the condition is not satisfied, the user management device 110 performs step 332 and subsequent steps (722).

When the condition is satisfied in step 716, the user management device 110 registers the instance ID 712 to the user management table 112 (718). Then, the user management device 110 sets the information indicating "server first booted" to the boot type 236 of the user management table 112 (720). Then, the user management device 110 performs step 618 and subsequent steps (724).

Figure 8:
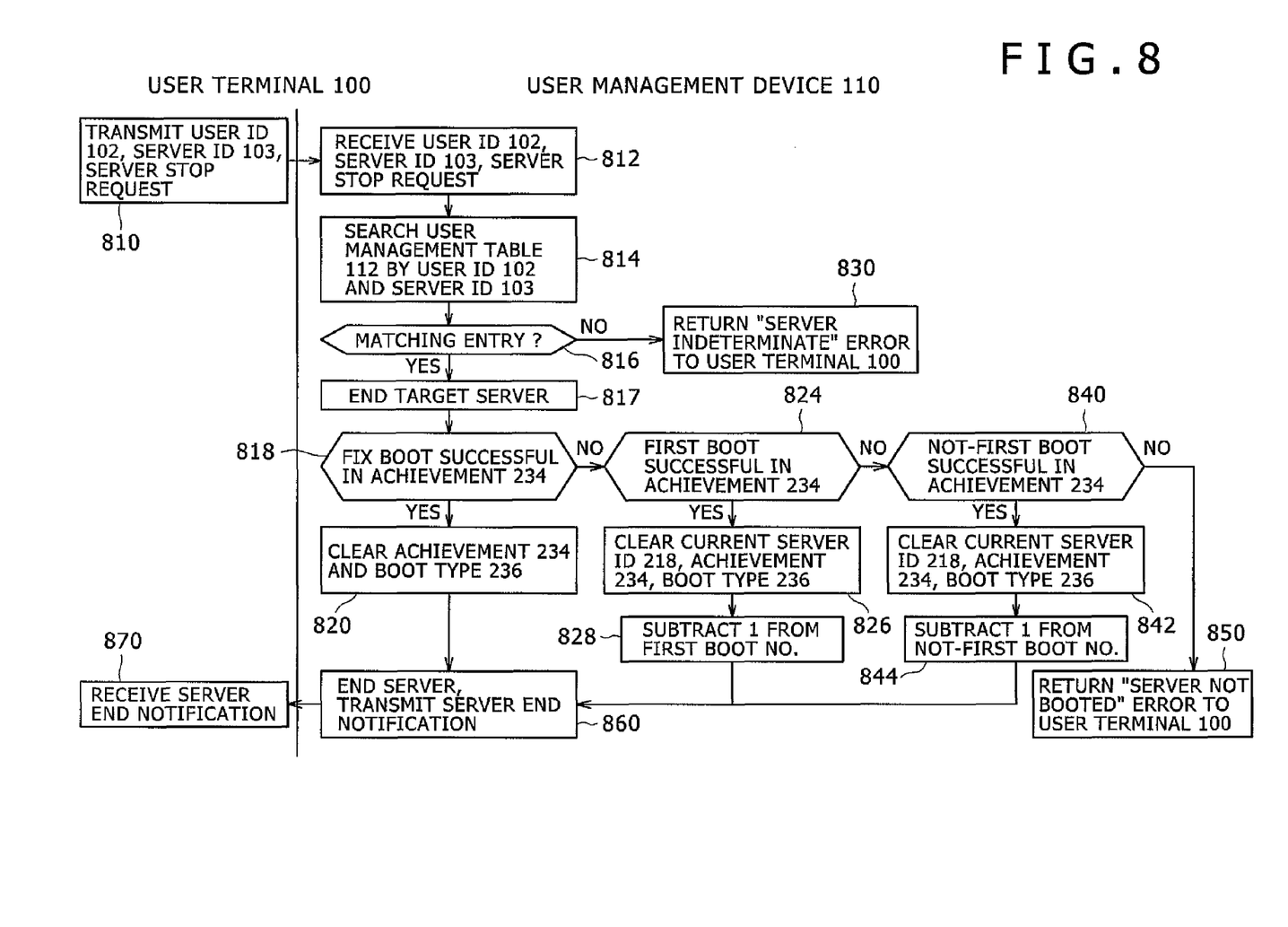
FIG. 8 is a flowchart showing the procedure for ending the server use.

FIG. 8 is a flowchart showing the procedure for ending the use of the server. In order to end the use of the server, the user terminal 100 transmits the user ID 102, the server ID 103, and a server stop request to the user management device 110 (810). The user management device 110 receives the information from the user terminal 100 (812), and searches the user management table 112 based on the user ID 102 and the server ID 103 (814). The user management device 110 checks whether the search result has a corresponding entry (816), and if not, returns an error including the information indicating "server indeterminate" to the user terminal 100 (830). When the condition is satisfied in step 816, the user management device 110 ends the target server (817). Then, the user management device 110 checks the achievement 234 in the entry to determine whether the fix boot is successful (818). When this condition is satisfied, the user management device 110 clears the achievement 234 and the boot type 236 in the user management table 112 (820). Then, the user management device 110 transmits a server end notification to the user terminal 100 (860). The user terminal 100 receives the notification, and determines that the server end process is completed (870).

When the condition is not satisfied in step 818, the user management device 110 next checks whether the first boot is successful in the achievement 234 (824). When this condition is satisfied, the user management device 110 clears the current server ID 218, the achievement 234, and the boot type 236 in the user management table 112 (826). Then, the user management device 110 subtracts 1 from the first boot number 252 in the server group management table 114 (828). Then, the user management device 110 performs step 860 and subsequent steps to notify the user terminal 100 of the end of the server.

When the condition is not satisfied in step 824, the user management device 110 next checks whether the not-first boot is successful in the achievement 234 (840). When this condition is not satisfied, the user management device 110 returns an error including the information indicating "server not booted" to the user terminal 100 (850).

When the condition is satisfied in step 840, the user management device 110 clears the current ID 218, the achievement 234, and the boot type 236 in the user management table 112 (842). Then, the user management device 110 subtracts 1 from the not-first boot number in the server group management table 114 (844). Then, the user management device 110 performs step 860 and subsequent steps to notify the user terminal 100 of the end of the server.

As described above, the server specification flag 120 is transmitted at the time when a server is booted. Based on the specification flag 120, whether the boot is allowed or not is determined by the difference between the upper threshold of each boot type and the current running number, using the information set for each user and for each server group. This makes is possible to control the allocation of each server, without communicating the information relating to the server and the load on the network between a device for controlling a plurality of server groups, such as the user management device 110, and the individual server groups. There is also the effect that even when the number of users increases, the system can be operated without impairing the use purpose of each user. In this system, the user management device 110 holds both the server specification flag 120 transmitted from the user terminal 100 as the achievement 234, and the result after the boot of the server, in order to manage which server resource is released at the server end. Further, the user management device 110 notifies the user terminal 100 of the achievement 234 after the boot of the server, in order to allow the user terminal 100 to know whether the server is booted as intended. Based on the information notified by the user management device 110, the user terminal 100 can know that the boot is not the intended one, and can try another boot by changing the specification of the server specification flag 120, and the like.

In this system, when the achievement 234 is "not-first boot successful in the first boot", and when the server group, to which the first boot would apply after the boot, is available, the user management device 110 may notify the user terminal 100 of the fact. Further, when the movement permission 226 is effective, the user management device 110 may automatically perform server migration, and change the achievement 234 to "first boot successful in the first boot". Further, when the movement permission 226 is effective with the server booed in the not-first boot, the user management device may perform server migration according to the server load. There are two types in the migration according to the server load. One is for collecting the server in order to consolidate the number of servers. The other is for migrating to a less used server in order to disperse the load on the server. In both cases, the user management device 110 may use the movement permission 226 in order to determine whether to perform the current policy.

Further, when the difference is large between the fix boot threshold 244 and the fix boot number 250 and when this state continues for a long time, the user management device 110 and the server group 150 may reduce the fix boot threshold 244, while increasing the first boot threshold 246 or the not-first boot threshold 248. When there is a difference in the computer performance, the memory capacity, and the like, in one server group, it may be possible to set the fix boot threshold 244, or the first boot threshold 246, or the not-first boot threshold 248, according to each type.

Further, in order to delete the corresponding entry in the user management table 112, the user terminal 100 may transmit an entry deletion request, in addition to the user ID 102 and the server ID 103. Then, the user management device 110 may delete the entry based on the request.

Further, in order to change the corresponding entry in the user management table 112, the user terminal 100 may transmit an entry change request and the information relating to the content to be changed, in addition to the user ID 102 and the server ID 103. Then, the user management device 110 may change the entry based on the request.

Further, in order to prevent data sniffing, the data flowing from the user terminal 100 to the user management device 110 may be encrypted, and may also be signed for integrity protection. Further, the user terminal 100 may be authorized before transmitting the information of step 310, or other information.

A second embodiment of the present invention is a billing control system using the server specification flag 120 and the achievement 234. As described in the first embodiment, the user terminal 100 can boot according to the use purpose by the use of the server specification flag 120. However, for the system operator, the fix boot is the mode for occupying the resources of servers, and the non-fix boot is the mode for effectively using the space of resources of servers. The two boot modes are obviously different in the operation cost, and would be provided to the user terminal 100 according to the cost. For example, when the information department of a company uses the present system, it is thought that in response to a server allocation request from a department in the company, the information department classifies servers into those to which the fix boot should apply and those to which the not-first boot may apply, in order to make interdepartmental settlement according to the use time. Another example is such that when services are provided to others and general users as a cloud computing service, the services are charged according to the boot type.

In FIG. 1, after the server is booted (after the completion of steps 328, 418, 518, and 624), the user management device 110 transmits the user ID 102 and the achievement 234 to the billing server 130 (132). Then, the billing server 130 starts billing. When the server is ended (after the completion of step 187), the user management device 110 similarly transmits the user ID 102 and the achievement 234 to the billing server 130 (133). Then, the billing server 130 completes billing. The billing server 130 may manage the achievement 234 transmitted from the user management device 110 by each counter according to the content of the achievement 234. The counter may be incremented upon booting and decremented upon ending. The number of the counter is a multiplier to multiply the charge per unit time. Thus, the charge may be determined by adding the sum per unit time. It is also possible that the user management device 110 adds the server ID 214 to the information to be transmitted to the billing server 130, and that the billing server 130 performs billing by individually managing the use time of each server. At this time, the user management device 110 may transmit the group ID 262 instead of the user ID 102.

As described above, it is possible to classify servers according to the use purpose by changing the charge according to the boot type. It is assumed that the system is operated with a certain difference in the pricing of the boot modes, for example, the fix boot is priced at 50 yens per hour with the annual contract for occupation priced at 10,000 yens, and the not-first boot is priced at 20 yens per hour. In this case, the user terminal 100 would apply the fix boot only to mission critical applications and would apply the not-first boot to the other purposes. At this time, the operator can charge a higher price for the user terminal 100 that requests the fix boot. While, the operator can operate the system effectively by the use of server consolidation for the user terminal 100 that requests the not-first boot. Further, by increasing and reducing the fix boot threshold 244 and the not-first boot threshold 248 in the server group management table 114 according to the trend of use, it is possible to reduce the risk associated with the system configuration, while allowing for seamless migration to the cloud service from the hosting service.

Further, the system may typically be operated based on the fix boot type, according to the type of group and user, independent of the server specification flag 120. At this time, the server specification flag 120 may be omitted.

As described above, according to the embodiment of the present invention, a user for whom the stability of the process performance in each server is important, can obtain stable performance by specifying occupation. While a user for whom it is not important, can use the resource of an unused server. Further, the cost paid by the user is calculated differently between specifying occupation and specifying non-occupation, according to the achievement. This makes it possible to classify users into two types: one is those who want occupation, and the other is those who want non-occupation. As a result, it is possible to simplify the allocation management of physical servers and virtual servers.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications within the ambit of the appended claims.

What is claimed is:
1. A computer system comprising:
a user terminal;
a plurality of servers connected to the user terminal through a network to provide services; and
a management device for managing a server for providing a service to the user terminal,
wherein the user terminal transmits boot information indicating one boot mode selected from among fix boot, first boot, or not-first boot, to the management device,
wherein, if the boot mode is the fix boot, the management device selects a first server from a server group which provided a service to the user terminal previously,
if the boot mode is the first boot, the management device selects a second server preferentially from a server group designated by the user terminal, and
if the boot mode is the not-first boot, the management device selects a third server from one of a plurality of server groups,
wherein the selected server provides the service to the user terminal,
wherein the management device obtains upper-limit information stored in a storage indicating an upper limit number of servers that can be booted in each mode of the fix boot, the first boot, and the not-first boot, and currently-booted information indicating a number of servers currently booted in each mode of the fix boot, the first boot, and the not-first boot,
wherein, when the upper limit number of servers of a boot mode indicated in the boot information transmitted from the user terminal, is greater than the number of servers currently booted in the boot mode as indicated by the currently-booted information, the management device selects a server for the boot mode transmitted form the user terminal, as a server for providing a service to the user terminal.
2. The computer system according to claim 1,
wherein the management device transmits success-or-failure information indicating whether the selected server is successfully booted in the boot mode, to the user terminal.

3. The computer system according to claim 2,
wherein the success-or-failure information includes the boot information transmitted from the user terminal, and the boot information indicating the actual mode of the server to provide the service to the user terminal.

4. The computer system according to claim 2,
wherein the user terminal further includes a billing server for controlling the use of the user terminal,
wherein the management device transmits the success-or-failure information to the billing server,
wherein the billing server determines a charge attributable to the user terminal, based on the success-or-failure information.

5. A management device for selecting a server for providing a service to a user terminal, from a plurality of servers connected to the user terminal through a network to provide services to the user terminal,
wherein the management device comprises:
a Communication unit for communication with the user terminal through the network; and
an operation unit for selecting a server for providing a service to the user terminal based on the information received through the communication unit,
wherein the communication unit receives boot information transmitted from the user terminal to indicate one boot mode selected from among fix boot, first boot, and not-first boot,
wherein the operation unit selects a server for providing a service to the user terminal based on the boot information according to:
if the boot mode is the fix boot, the operation unit selects a first server from a server group which provided a service to the user terminal previously,
if the boot mode is the first boot, the operation unit selects a second server preferentially from a server group designated by the user terminal, and
if the boot mode is the not-first boot, the operation unit selects a third server from one of a plurality of server groups,
wherein the selected server provides the service to the user terminal,
wherein the operation unit obtains upper-limit information stored in a storage indicating an upper limit number of servers that can be booted in each mode of the fix boot, the first boot, and the not-first boot, and currently-booted information indicating a number of servers currently booted in each mode of the fix boot, the first boot, and the not-first boot,
wherein, when the upper limit number of servers of a boot mode indicated in the boot information transmitted from the user terminal, is greater than the number of servers currently booted in the boot mode as indicated by the currently-booted information, the operation unit selects a server for the boot mode transmitted form the user terminal, as a server for providing a service to the user terminal.

6. The management device according to claim 5,
wherein the communication unit transmits success-or-failure information indicating whether the selected server is successfully booted in the boot mode, to the user terminal.

7. The management device according to claim 6,
wherein the success-or-failure information includes the boot information transmitted from the user terminal, and the boot information indicating the actual mode of the server to provide the service to the user terminal.

8. A computer system comprising:
a user terminal;
a plurality of servers connected to the user terminal through a network to provide services; and
a management device for managing a server for providing a service to the user terminal,
wherein the user terminal transmits boot information indicating one boot mode selected from among fixed-location boot, prioritized boot, or non-prioritized boot, to the management device,
wherein, if the boot mode is the fixed-location boot, the management device selects a first server from a server group which provided a service to the user terminal previously,
if the boot mode is the priority boot, the management device selects a second server preferentially from a server group designated by the user terminal, to optimized a route, and
if the boot mode is the non-prioritized boot, the management device selects a third server from one of a plurality of server groups, without regard to optimize a route,
wherein the selected server provides the service to the user terminal,
wherein the management device obtains upper-limit information stored in a storage indicating an upper limit number of servers that can be booted in each mode of the fixed-location boot, the prioritized boot, and the non-prioritized boot, and currently-booted information indicating a number of servers currently booted in each mode of the fixed-location boot, the prioritized boot, and the non-prioritized boot,
wherein, when the upper limit number of servers of a boot mode indicated in the boot information transmitted from the user terminal, is greater than the number of servers currently booted in the boot mode as indicated by the currently-booted information, the management device selects a server for the boot mode transmitted form the user terminal, as a server for providing a service to the user terminal.

9. The computer system according to claim 8,
wherein the management device transmits success-or-failure information indicating whether the selected server is successfully booted in the boot mode, to the user terminal.

10. The computer system according to claim 9,
wherein the success-or-failure information includes the boot information transmitted from the user terminal, and the boot information indicating the actual mode of the server to provide the service to the user terminal.

11. The computer system according to claim 9,
wherein the user terminal further includes a billing server for controlling the use of the user terminal,
wherein the management device transmits the success-or-failure information to the billing server,
wherein the billing server determines a charge attributable to the user terminal, based on the success-or-failure information.

* * * * *